O. T. BLÁTHY.
ADJUSTING INTEGRATING ELECTRICITY METERS.
APPLICATION FILED NOV. 6, 1920.

1,424,752.

Patented Aug. 8, 1922.

Inventor:
Otto Titusz Bláthy
By Emery, Booth, Janney, & Varney,
Attys.

UNITED STATES PATENT OFFICE.

OTTO TITUS BLÁTHY, OF BUDAPEST, HUNGARY.

ADJUSTING INTEGRATING ELECTRICITY METERS.

1,424,752.     Specification of Letters Patent.     Patented Aug. 8, 1922.

Application filed November 6, 1920. Serial No. 422,321.

*To all whom it may concern:*

Be it known that I, Dr. OTTO TITUS BLÁTHY, a citizen of Hungary, residing at Budapest, in the Kingdom of Hungary, have invented certain new and useful Improvements in Adjusting Integrating Electricity Meters, of which the following is a specification.

My invention relates to a method for adjusting integrating electricity meters with rotating discs or armatures.

In the Patent Number 1,199,150 for method for adjusting electric meters, granted September 26, 1916, I have shown a method based on the stroboscopic principle according to which the rotary part of the meter has a disc provided with marks arranged at regular intervals in a circle, said marks being observed through apertures provided on the rotary disc of a normal meter and the adjustment of the meter under test is altered until the marks on its disc appear to be stationary.

This method has however the drawback that the meter to be adjusted must be brought in a determined relative position with respect to the normal meter.

Another method consists in projecting on the rotary disc provided in the above indicated manner with marks a beam of light periodically obstructed by a revolving diaphragm driven in synchronism with the normal meter. If the synchronism of this latter and the meter to be adjusted is reached, the marks on the disc appear to be stationary.

This second method involves in addition to the drawbacks of the first method, great constructional difficulties.

According to my invention I eliminate all these drawbacks attaining at the same time substantial advantages.

With my method I provide the rotary disc of the meters to be adjusted in the above indicated manner with marks arranged at regular intervals in a circle. If a greater number of meters are to be adjusted all may be connected in series in the same circuit. The meters to be adjusted are illuminated according to my invention with electric lamps, the luminous intensity of which fluctuates with the undulations of the feeding alternating current f. i. arc-lamps, or metallic filament lamps preferably gas filled lamps, said lamps being fed by an alternating current, the frequency of which is in such proportion to the number of marks provided on the rotary disc of the meters to be adjusted, that at the correct speed of the meters corresponding to their test-load, the number of marks on the meter-discs passing a fixed point is equal to, or is a simple multiple or a simple fraction of the number of reversals of the alternating current feeding the lamps. The meters are adjusted until the marks on the meter-discs appear to be stationary.

My experiments have shown, that the adjustment of the meters can be effectuated with perfect ease and accuracy even if the periodical fluctuations of the luminous intensity remain within relatively narrow limits as is the case f. i. with the common tungsten filament lamps. Moreover the diffuse day-light in the room, in which the adjusting is done, does not interfere with the stroboscopic effect of the fluctuations of the light of the lamps illuminating the marks on the meter-discs.

The adjustment can be done most easily if the number of the marks of the meter-disc passing a fixed point per second is equal to the number of reversals (viz, double the periods) of the alternating current feeding the lamps. However satisfactory results may be attained, if the number of the marks is double or even treble, or one half or one third of the number of reversals of the current. In these latter cases it is however advisable to limit the field of vision with the hand or by a diaphragm.

The adjusting-load may be measured by a wattmeter, and the frequency corresponding to this load may be ascertained by a frequency-meter or by a tacho-meter. The meters being correctly adjusted, the marks on the meter-discs will appear to be stationary if the frequency of the current feeding the lamps is in a determined relation to the load of the meters, said relation being for a given meter-type the same for all loads and corresponding frequencies. Thus before proceeding to adjust the meters, either the frequency of the illuminating current, or preferably the load of the meters must be varied in order to establish the determined relation between the frequency and the load.

Instead of ascertaining the load and the frequency by means of separate instruments, a standard meter may be connected in series with the meters to be tested, and the frequency of the illuminating current or preferably the load of the meters is varied until the marks on the discs of the standard meter appear to be stationary.

In the annexed drawing I have shown diagrammatically an embodiment of my invention.

Fig. 2 is a portion of the meter-disc. $m_1$—$m_3$ are the meters to be adjusted and M is the standard meter. The discs $d$ of the meter M and $m_1$—$m_3$ are provided with marks $e$ (Fig. 2) arranged in a circle for example perforations, radial lines, teeth on the periphery of the disc or the like.

Figure 1:
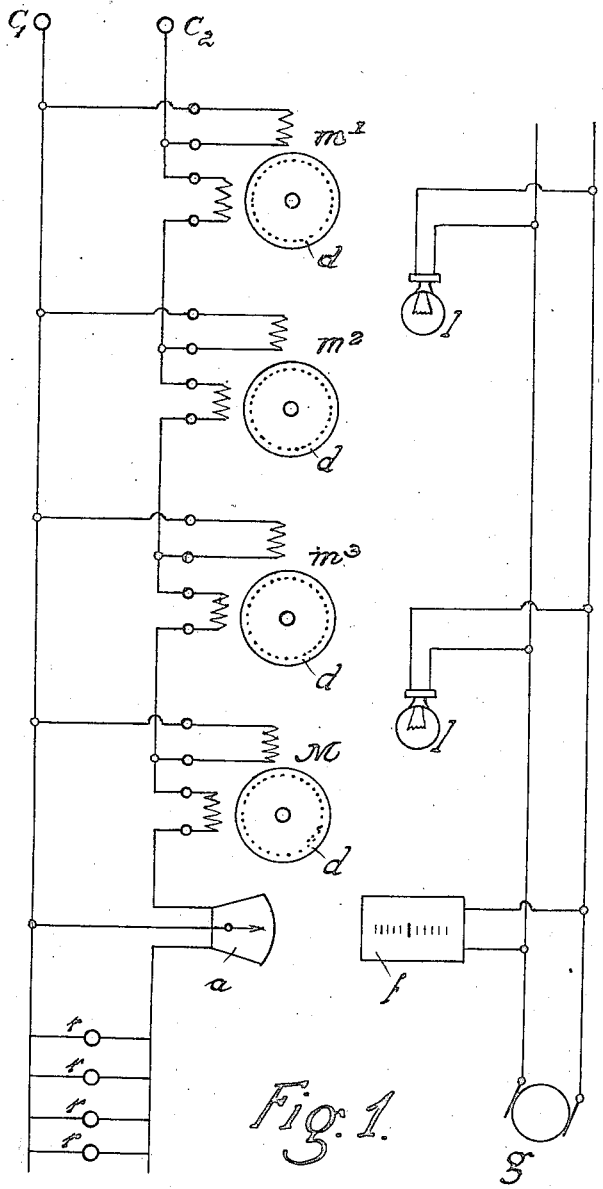
Fig. 1 is the whole arrangement.
Figure 2:
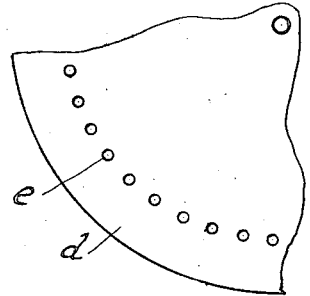

The meters M and $m_1$—$m_3$ are connected in series in the circuit $C_1$—$C_2$. $a$ is a wattmeter and $r$, $r$ are lamps or the like allowing to vary the load of the circuit $C_1$—$C_2$.

$l$, $l$ are metallic-filament lamps, illuminating the meters, $g$ is an alternating current generator of the desired frequency and $f$ is a frequency-meter connected to the circuit of the generator $g$.

The adjusting of the meters $m_1$—$m_3$ is generally effectuated at about ¾ load and the frequency of the current of the generator $g$ is in accordance with this load. The current flowing through the meters is varied by means of turning in or out lamps $r$ until the marks of the disc $d$ of the normal meter M appear to be stationary. Then the meters $m_1$, $m_2$, etc., are adjusted till the marks on their respective discs seem to stand still.

If it is desired to verify the meters at several different loads, generators giving frequencies corresponding to the desired loads must supply current to the circuit of the lamps $l$ instead of the generator $g$.

As shown an arbitrary number of meters can be connected simultaneously into the circuit and the illuminating lamps may be arranged either above every meter, or common lamps may be provided for a group of meters. As already mentioned the diffuse day-light in the testing room does not interfere materially with the work of adjusting the meters. However the day-light may be shut out and the meter testing room as a whole be illuminated with one or more gas-filled tungsten filament lamps or arc-lamps fed with an alternating current of the required frequency.

According to my invention the testing can be done without observing any instruments or appliances and with full freedom of movement, free eyes and both hands can be used for effecting the adjustment. The meters to be adjusted are not confined to a determined spot and several meters may be surveyed simultaneously by the operator, allowing him, while adjusting a meter, to throw a glance on the meters already adjusted to ascertain whether their disc-marks remain stationary.

This allows an easy supervision of the adjusting work, as it is sufficient for the surveying clerk to walk through the testing-room and to throw a glance over the meters under test to verify their exact adjusting.

My method allows not only a hitherto not attained efficiency, but owing to the easy supervision affords a very high grade of reliability.

What I claim is:

1. A method for adjusting electric meters consisting in: providing the rotary parts of the meters with marks arranged at regular intervals in a circle, illuminating said meters while under test with electric lamps the luminous intensity of which fluctuates according to the undulations of the feeding current; feeding said lamps by an alternating current the frequency of which is in such proportion to the number of marks on the rotary parts of the meters, that at the speed of the meters corresponding to their test-load, the number of marks on the rotary part of the meter passing a fixed point is equal to, or is a simple multiple or a simple fraction of the number of reversals of the current feeding said lamps; and adjusting the meters until the marks on their rotary parts appear to be stationary.

2. A method for adjusting electric meters consisting in: providing the rotary parts of the meters with the marks arranged at regular intervals in a circle; illuminating said meters while under test with metallic filament lamps; feeding said lamps with an alternating current the frequency of which is in such proportion to the number of marks on the rotary part of the meters, that at the speed of the meters corresponding to their test-load, the number of marks on the rotary part of the meters passing a fixed point is equal to, or is a simple multiple or a simple fraction of the number of reversals of the current feeding said lamps; and adjusting the meters until the marks on their rotary parts appear to be stationary.

3. A method for adjusting electric meters consisting in: providing the rotary parts of the meter with marks arranged at regular intervals in a circle; illuminating said meters while under test with gas-filled metallic filament lamps; feeding said lamps by an alternating current the frequency of which is in such proportion to the number of marks on the rotary part of the meters, that at the speed of the meters corresponding to their test-load, the number of marks on the rotary part of the meters passing a fixed point is equal to, or is a simple multiple or a simple fraction of the number of reversals of the current feeding said lamps; and adjusting the meters until the marks on their rotary parts appear to be stationary.

4. A method for adjusting electric meters consisting in providing the rotary parts of the meters with marks arranged at regular intervals in a circle; illuminating said meters while under test with electric lamps, the luminous intensity of which fluctuates according to the undulations of the feeding current; feeding said lamps by an alternating current, the frequency of which is in such proportions to the number of marks on the rotary parts of the meters, that at a given speed of the meters, the number of marks on the rotary part of the meter passing a given point is in predetermined proportion to the number of reversals of the current feeding said lamps; and adjusting the meters until the marks on their rotary parts appear to be stationary.

In testimony whereof I affix my signature in presence of two witnesses.

Dr. OTTO TITUS BLATHY.

Witnesses:
    EUGENE HARRANY,
    CHAS. MEDGYNES.